United States Patent
Sheng et al.

(10) Patent No.: US 8,738,774 B2
(45) Date of Patent: *May 27, 2014

(54) COULD-BASED DYNAMIC SESSION LICENSE CONTROL

(71) Applicant: Sansay, Inc., San Diego, CA (US)

(72) Inventors: Jonqjenq Max Sheng, San Diego, CA (US); Gerald T. Ryner, San Diego, CA (US); Glen Gerhard, San Diego, CA (US)

(73) Assignee: Sansay, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/101,185

(22) Filed: Dec. 9, 2013

(65) Prior Publication Data

US 2014/0101313 A1    Apr. 10, 2014

Related U.S. Application Data

(63) Continuation of application No. 13/724,072, filed on Dec. 21, 2012, now Pat. No. 8,606,899.

(60) Provisional application No. 61/652,419, filed on May 29, 2012.

(51) Int. Cl.
*G06F 15/173*    (2006.01)
*H04L 12/02*    (2006.01)
*H04L 12/26*    (2006.01)
*H04L 29/06*    (2006.01)

(52) U.S. Cl.
CPC ............ *H04L 12/02* (2013.01); *H04L 12/26* (2013.01); *H04L 12/2634* (2013.01); *H04L 12/2671* (2013.01); *H04L 65/80* (2013.01)
USPC ........................ 709/225; 709/223; 709/224

(58) Field of Classification Search
CPC ..... H04L 12/02; H04L 12/26; H04L 12/2634; H04L 12/2671; H04L 41/50; H04L 41/5003; H04L 65/80
USPC .......................................... 709/223, 224, 225
See application file for complete search history.

*Primary Examiner* — Asghar Bilgrami
(74) *Attorney, Agent, or Firm* — Proskauer Rose LLP

(57) ABSTRACT

A method for controlling session access within a cloud-based network license zone (NLZ) includes registering one or more virtual machines, modifying a zone-wide session license based upon the registration step and transmitting the modified license to the plurality of virtual machines. The method also includes periodically receiving a network access message from each of the other virtual machines, each network access message including a count of active sessions enumerated by service type currently processed by the other virtual machine, determining a summation of active sessions, the summation based in part on the network access messages and a count of active sessions currently processed by the virtual machine, and enforcing a total count of active sessions, each virtual machine configured to reject new session requests received at the virtual machine when the total count of active sessions exceeds a predetermined number of active sessions as defined in the modified license.

30 Claims, 5 Drawing Sheets

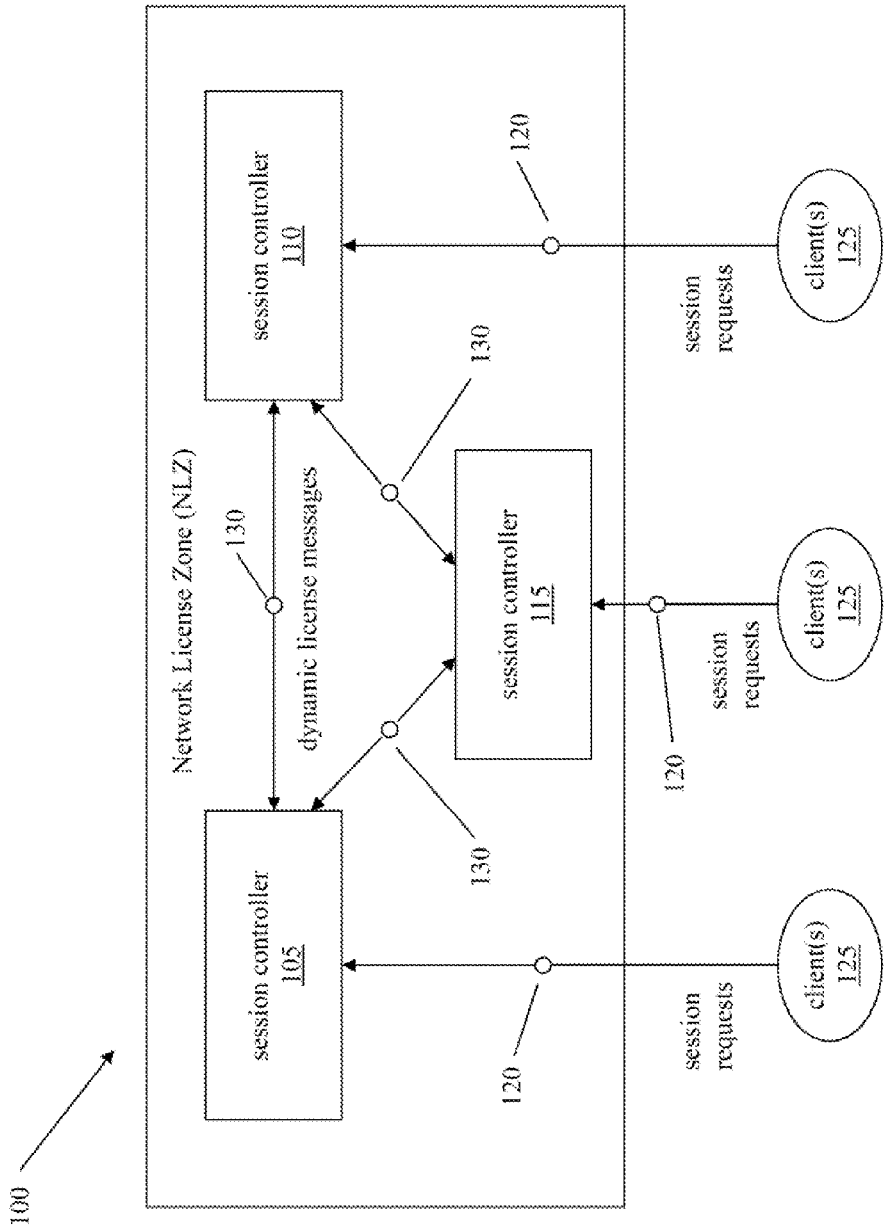

COULD-BASED DYNAMIC SESSION LICENSE CONTROL

RELATED APPLICATION

This application is a continuation of U.S. patent application Ser. No. 13/724,072, filed on Dec. 21, 2012, which claims priority to Ser. No. 61/652,419, filed on May 29, 2012, the entire disclosure of which is incorporated herein by reference.

TECHNICAL FIELD

The present inventive concepts generally relate to systems and methods for controlling session licenses, and more particularly, to systems and methods for controlling session access within a network license zone.

BACKGROUND

An Internet Protocol (IP) session involves the connection between two devices across a network of routers, cables and switches for the purpose of exchanging packets of information. For example, an IP session can be created by a device using a signaling protocol such as the Session Initiation Protocol (SIP) for placing a long distance phone call. To initiate a session, a client device sends a session request to a server device in a network. The server device receives the session request, and grants or denies session access based on a session license count. These server devices are typically manufactured by network equipment companies and sold to internet service providers and carriers. The server devices are usually sold and licensed according to a maximum concurrent session limitation. Generally, equipment manufacturers pre-authorize each physical instance or node with a maximum concurrent session capability (i.e., session license). When multiple instances are deployed throughout a network, the service provider is forced to purchase an independent license for each device.

SUMMARY OF THE INVENTION

Licensing based on concurrent sessions has become a popular form of purchasing internet based application layer software and systems. Licenses can be categorized and include several different types of service requests that can be independently tracked across a network for individual usage and/or combined usage. For example, service types can include Total Sessions, Peering Sessions, Access Sessions, Subscriber Sessions, Transcoding Sessions by codec type, Presence Sessions, Video Sessions, Expansion Sessions, Burst Sessions, Media Sessions, DB Queries per second, Instant Messenger (IM) Messages per second, Simple Message Service (SMS) Message per second, Voice over IP (VoIP) sessions, and the like.

VoIP carriers typically operate in multiple geographic sites and, as such, experience traffic loading patterns that vary and shift depending on the time of day within each region. Previously, carriers were forced to purchase a maximum concurrent license for each system that was large enough to accommodate the maximum loading required at that node. The systems and methods described herein allow a pool of licenses to shift between nodes dynamically, thus reducing the overall number of licenses needed by a carrier or operator. The systems and methods also allow for the creation of a network session license, which is independent of any one physical device and can "float" between multiple physical devices or nodes. These systems and methods implement an average network session license enforcement through the use of periodic and/or regular peer-to-peer communications between server instances or nodes. The systems and methods can also be configured to detect and process tandem sessions, where one user session traverses two or more nodes, such that they are only counted once according to the network license based on the originating node information.

The invention, in one aspect, features a method for controlling session access within a cloud-based network license zone (NLZ), where the NLZ is a plurality of virtual machines that are operated by a single entity and are configured to permit session access according to a zone-wide session license. A cloud license manager within the NLZ registers one or more virtual machines. The cloud license manager modifies the zone-wide session license based upon the registration step and transmits the modified zone-wide session license to the plurality of virtual machines within the NLZ. Each of the plurality of virtual machines within the NLZ receives periodically a network access message from each of the other virtual machines within the NLZ, each network access message including a count of active sessions enumerated by service type currently processed by the other virtual machine. Each of the plurality of virtual machines within the NLZ determines a summation of active sessions within the NLZ, the summation based in part on the network access messages and a count of active sessions currently processed by the virtual machine. Each of the plurality of virtual machines within the NLZ enforces a total count of active sessions within the NLZ, each virtual machine configured to reject new session requests received at the virtual machine when the total count of active sessions within the NLZ exceeds a predetermined number of active sessions as defined in the modified zone-wide session license.

The invention, in another aspect, features a system for controlling session access within a cloud-based network license zone (NLZ), where the NLZ is a plurality of virtual machines that are operated by a single entity and are configured to permit session access according to a zone-wide session license. The system includes a cloud license manager within the NLZ that is configured to register one or more virtual machines and modify the zone-wide session license based upon the registration step and transmitting the modified zone-wide session license to the plurality of virtual machines within the NLZ. The system includes a plurality of virtual machines within the NLZ, where each of the plurality of virtual machines is configured to receive periodically a network access message from each of the other virtual machines within the NLZ, each network access message including a count of active sessions enumerated by service type currently processed by the other virtual machine, determine a summation of active sessions within the NLZ, the summation based in part on the network access messages and a count of active sessions currently processed by the virtual machine, and enforce a total count of active sessions within the NLZ, each virtual machine configured to reject new session requests received at the virtual machine when the total count of active sessions within the NLZ exceeds a predetermined number of active sessions as defined in the modified zone-wide session license.

The invention, in another aspect, features a computer program product, tangibly embodied in a computer readable storage device, for controlling session access within a network license zone (NLZ), where the NLZ is a plurality of virtual machines that are operated by a single entity and are configured to permit session access according to a zone-wide session license. The computer program product includes instructions being executable to cause a cloud license manager within the NLZ to register one or more virtual machines, and modify the zone-wide session license based upon the registration step and transmitting the modified zone-wide session license to the plurality of virtual machines within the NLZ. The computer program product also includes instructions being executable to cause each of the other virtual machines within the NLZ to periodically receive a network access message from each of the other virtual machines within the NLZ, each network access message including a count of active sessions enumerated by service type currently processed by the other virtual machine, determine a summation of active sessions within the NLZ, the summation based in part on the network access messages and a count of active sessions currently processed by the virtual machine, and enforce a total count of active sessions within the NLZ, the virtual machine configured to reject new session requests received at the virtual machine when the total count of active sessions within the NLZ exceeds a predetermined number of active sessions as defined in the modified zone-wide session license.

Any of the above aspects can include one or more of the following features. In some embodiments, each of the plurality of virtual machines within the NLZ determines a summation of active sessions for a first service type, the summation based in part on the network access messages and a count of active sessions of the first service type currently processed by the virtual machine, and enforces a count of active sessions for the first service type within the NLZ, each virtual machine configured to reject new session requests for the first service type received at the virtual machine when the total count of active sessions of the first service type within the NLZ exceeds a predetermined number of active sessions of the first service type as defined in the modified zone-wide session license.

In some embodiments, each of the plurality of virtual machines within the NLZ is further configured to accept new session requests of the first service type received at the virtual machine when the count of active sessions for the first service type within the NLZ is below the predetermined number of active sessions of the first service type. In some embodiments, each of the plurality of virtual machines within the NLZ is further configured to accept new session requests associated with an emergency telephone call when the total count of active sessions within the NLZ exceeds the predetermined number of active sessions.

In some embodiments, each of the plurality of virtual machines within the NLZ includes a configurable list of emergency telephone calling numbers. In some embodiments, an active session originating at a first client device of a first one of the plurality of virtual machines within the NLZ and terminating at a second client device of a second one of the plurality of virtual machines within the NLZ is counted in the summation of active sessions determined by the first one of the plurality of virtual machines but is omitted from the summation of active sessions determined by the second one of the plurality of virtual machines. In some embodiments, an active session originating at a third client device of the second one of the plurality of virtual machines within the NLZ and terminating at a fourth client device of the first one of the plurality of virtual machines within the NLZ is counted in the summation of active sessions determined by the second one of the plurality of virtual machines but is omitted from the summation of active sessions determined by the first one of the plurality of virtual machines.

In some embodiments, the second one of the plurality of virtual machines within the NLZ is further configured to accept new session requests received at the second one of the plurality of virtual machines within the NLZ when the total count of active sessions within the NLZ is below the predetermined number of active sessions. In some embodiments, the registering step further comprises authenticating the one or more virtual machines based upon credential information transmitted to the cloud license manager. In some embodiments, the cloud license manager assigns the one or more virtual machines to an NLZ based upon the authentication step.

In some embodiments, the cloud license manager modifies the zone-wide session license to include an identifier associated with each of the registered virtual machines. In some embodiments, the NLZ includes the registered virtual machines after the registration step. In some embodiments, each of the plurality of virtual machines within the NLZ includes a node list including identifiers for all of the virtual machines within the NLZ. In some embodiments, the identifiers of the node list include IP addresses.

In some embodiments, each of the plurality of virtual machines modifies the node list based upon the modified zone-wide session license received from the cloud license manager. In some embodiments, the modified node list includes a number of licensed sessions by service type.

In some embodiments, each virtual machine is hosted on a separate hardware system. In some embodiments, the new session requests correspond to at least one selected from the group consisting of: a VoIP session request, a message for destination user, a request for a video stream, a chat session, a collaboration request, a data transfer channel, a text message and instant message.

In some embodiments, the zone-wide session license includes one or more categories of session access licenses. In some embodiments, the one or more categories of session access licenses is selected from the group consisting of: VoIP session access licenses, peering session access licenses, subscriber session access licenses, data channel connection licenses, Diameter message access licenses, transcoding session access licenses, presence session access licenses, video session access licenses, expansion session access licenses, burst session access licenses, media session access licenses, instant messenger session access licenses and XMPP session access licenses. In some embodiments, an active session originating at a first client device connected to a second one of the plurality of virtual machines within the NLZ and terminating at a first client device connected to a first one of the plurality of virtual machines within the NLZ is omitted from the summation of active sessions.

Other aspects and advantages of the technology will become apparent from the following detailed description, taken in conjunction with the accompanying drawings, illustrating the principles of the technology by way of example only.

BRIEF DESCRIPTION OF THE DRAWINGS

The foregoing and other objects, features and advantages of embodiments of the present inventive concepts will be apparent from the more particular description of preferred embodiments, as illustrated in the accompanying drawings in which like reference characters refer to the same elements throughout the different views. The drawings are not necessarily to scale, emphasis instead being placed upon illustrating the principles of the preferred embodiments.

FIG. 1 is a diagram that illustrates a network license zone architecture, in accordance with embodiments of the present application;

DETAILED DESCRIPTION

Figure 2A:
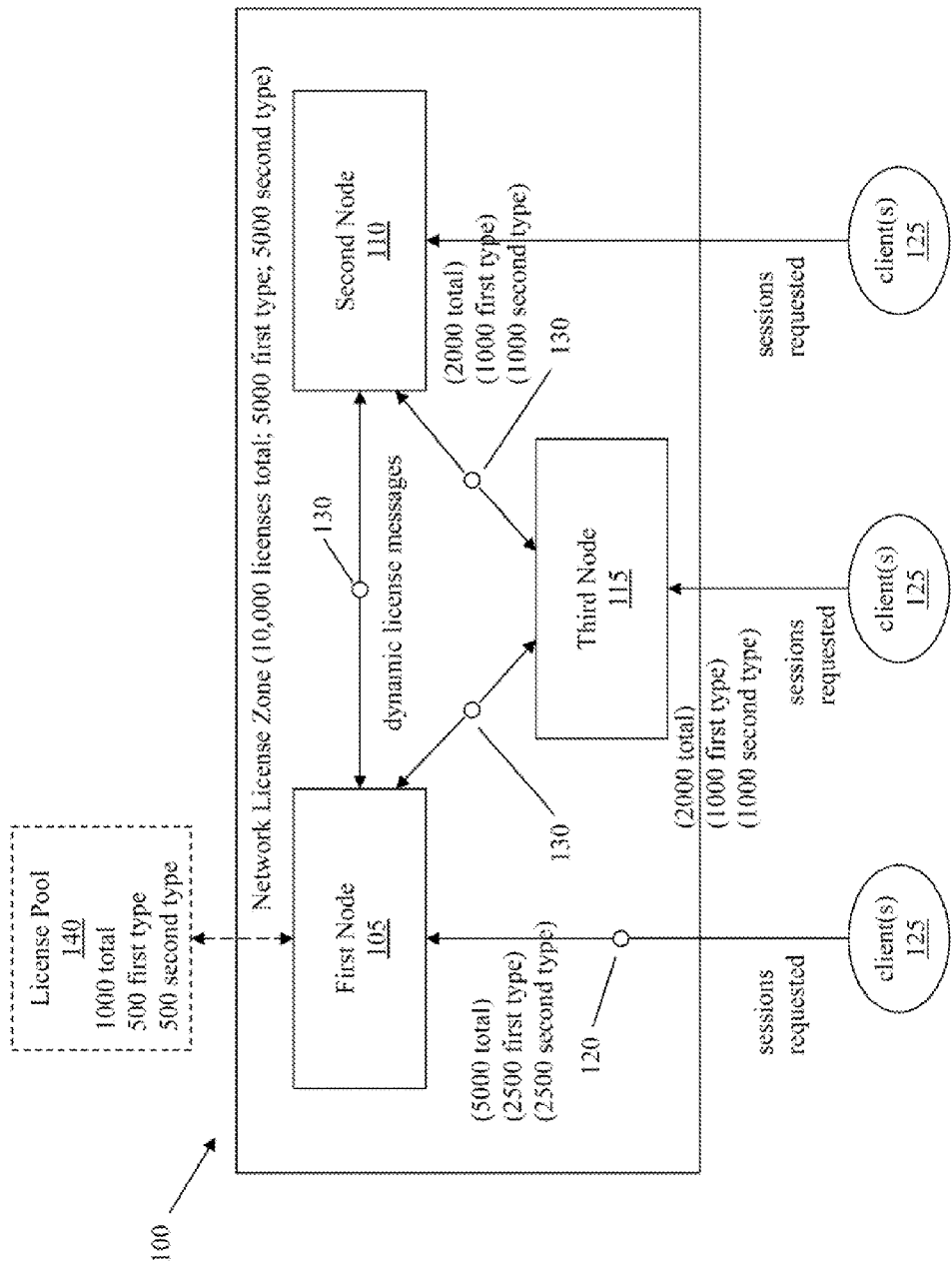
FIGS. 2A and 2B illustrate shifting of licenses between nodes in a network license zone architecture, in accordance with embodiments of the present application.

It will be understood that, although the terms first, second, third etc. may be used herein to describe various limitations, elements, components, regions, layers and/or sections, these limitations, elements, components, regions, layers and/or sections should not be limited by these terms. These terms are only used to distinguish one limitation, element, component, region, layer or section from another limitation, element, component, region, layer or section. Thus, a first limitation, element, component, region, layer or section discussed below could be termed a second limitation, element, component, region, layer or section without departing from the teachings of the present application.

FIG. 1 is a diagram that illustrates a network license zone (NLZ) architecture 100. In the present exemplary embodiment, the NLZ architecture 100 shown in FIG. 1 includes first through third instances or nodes 105, 110, 115, which are each configured to receive and process session requests 120 from one or more client devices 125. Although the NLZ architecture shown in FIG. 1 includes first through third instances or nodes 105, 110, 115, the concepts described in the present application can be applied to an NLZ architecture including any two or more nodes or instances. In some embodiments, the instances or nodes include session boarder controllers such as those shown in FIG. 1.

Dynamic session license control can be implemented as a peer-to-peer model where each instance or node 105, 110, 115 communicates directly with every other instance or node to communicate a number and/or type of sessions currently processed by the instance or node. For example, each node within the NLZ architecture 100 is configured with a list of all other server instances or nodes within the NLZ. The list can include IP addresses of the other server instances or nodes within the NLZ. In some embodiments, each instance or node is configured with an NLZ license that includes the list of IP addresses of the other instances or nodes with the NLZ. The NLZ license can also include a total number and/or type of sessions authorized for use within the NLZ.

In the peer-to-peer model, the server instances or nodes 105, 110, 115 periodically send NLZ packets 130, such as dynamic license messages, to each other at regular intervals. Each server instance or node 105, 110, 115 can be configured to use the list of NLZ nodes to authenticate an NLZ packet 130 before it is processed. A secure communication link, such as a Transport Layer Security protocol or other IPSec protocol, can provide authentication to protect the integrity of the NLZ packets sent across open internet environments.

The NLZ packets 130 include the number of active sessions that the sending node is currently processing for each service type. Each node or instance can be configured to send an NLZ packet 130 to every other node on a regular basis, for example, once per second. The period can be made faster or slower depending on the type of sessions being licensed and the rate at which the sessions are typically requested. Each node 105, 110, 115 is configured to process received NLZ packets 130 for the purpose of maintaining a running summation of all active sessions within the NLZ. That is, each node or instance 150, 110, 115 is configured to use this summation to determine if session requests 120 should be accepted or rejected for a particular service type according to the NLZ license.

The instances or nodes 105, 110, 115 can also be configured to detect missing NLZ packets 130 coming from other instances or nodes within the NLZ and "age" a previous summation of active sessions from the missing node. For example, if a number of missing NLZ packets 130 exceeds a predetermined threshold, the detecting instance or node will "age" the previous summation of active sessions from the missing node by decaying it to "0" after a predetermined amount of time, for example, in the range of 10 seconds to a minute. In this manner, licenses used by a failed node automatically return to the pool of operating instances or nodes after the predetermined amount of time. The threshold and decay rate are chosen in order to tolerate occasional packet loss across the internet without drastically affecting the summation totals.

In addition, each node can be configured to enter an alarm condition when the length of time that NLZ packets 130 from other nodes within the NLZ are missing exceeds the predetermined amount of time (e.g., 10 seconds to a minute). The instances or nodes 105, 110, 115 can be configured to automatically reduce the number of network license sessions within the NLZ when in the alarm condition for longer than a threshold period time, for example, in the range of 7 days to 60 days, so as to prevent operators of the instances or nodes 105, 110, 115 from intentionally severing the communication links between other instances or nodes for the purpose of processing more sessions than authorized by the purchased license (e.g. the NLZ license).

The NLZ architecture 100 allows dynamic session licenses to automatically shift to the areas of greatest demand. The fully meshed nature of the communication links between the instances or nodes within the NLZ allows for automatic failure recovery with no single point of failure. The architecture, systems and methods described above can be implemented in a "cloud" type deployment model where the instances or nodes run in a "virtual" environment decoupled from any one piece of hardware. An example of a "cloud" type deployment is described in U.S. Patent Application Publication No. 2010/0174815, entitled "Method and Apparatus for Network License Enforcement," the content of which is incorporated by reference herein in its entirety.

Unlike some embodiments of the present application, conventional network licensing systems and methods that use a centralized license server to control the distribution of session licenses suffer various performance and reliability flaws. For example, conventional network licensing systems having a single centralized license server can suffer performance issues when implemented in a distributed VoIP network for session control. That is, a centralized license server model requires each node to send a license request to the single centralized server for every session request made by a client device, which can create a call setup delay impacting overall system performance. In addition, the centralized license server model presents various reliability flaws. For example, the single centralized license server represents a single point of failure that can affect all session request processing throughout the network.

The NLZ architecture 100 implements an average license enforcement protocol whereas the conventional centralized license server model implements an exact license enforcement protocol. Average license enforcement is inherent in the NLZ architecture 100 because each node within the NLZ transmits NLZ packets 130 to every other node in the NLZ, for example, once per second. While changes in the session request rate throughout the NLZ can cause a temporary enforcement that is greater or less than the purchased license due to the periodic transmission of NLZ packets, over time the variations will average out to be the correct licensed value for the licensed services.

The instances or nodes 105, 110, 115 within the NLZ can also be configured to accept session requests for emergency telephone calls irrespective of available network licenses within the NLZ. For example, each instance or node 105, 110, 115 within the NLZ can be configured with a list of emergency calling numbers as the emergency calling numbers may be different across regions serviced by the instances or nodes within the NLZ.

Figure 2B:
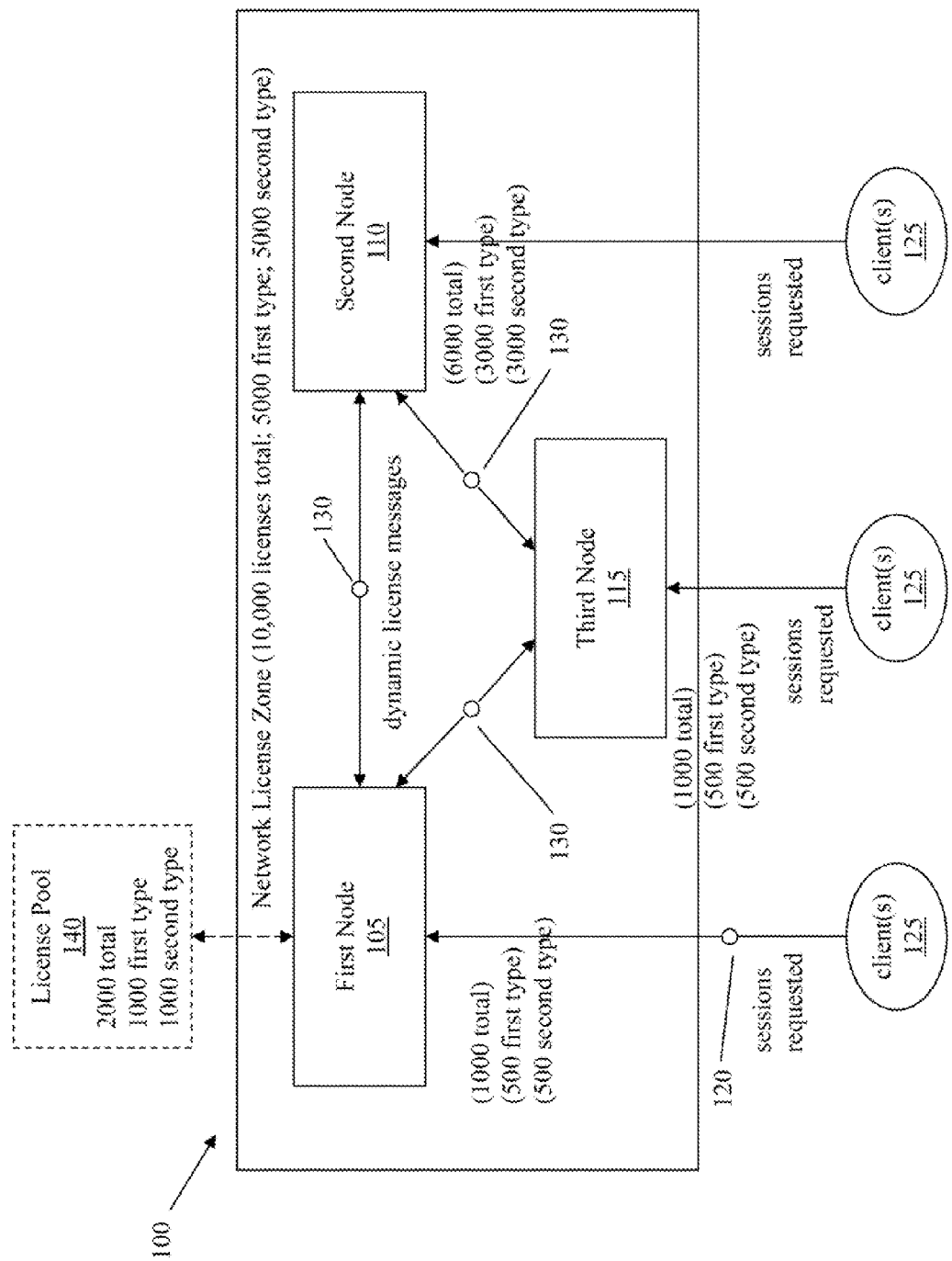

FIGS. 2A and 2B illustrate shifting of licenses between nodes in a network license zone architecture 100. In the present exemplary embodiment, the first through third nodes 105, 110, 115 of the NLZ are configured with a network session license that permits 10,000 total active sessions within the NLZ (5,000 session licenses correspond to a first service type, and 5,000 session licenses correspond to a second service type). Accordingly, a pool of 10,000 session licenses shifts between the first through third nodes 105, 110, 115 as traffic loading patterns change on each of the nodes.

Referring to FIG. 2A, the first node 105 is shown receiving first NLZ packets 130 from the second node 110 and the third node 115. The first NLZ packet 130 transmitted by the second node includes data indicating that the second node is handling 2,000 active sessions (1,000 of the first type, and 1,000 of the second type), and the first NLZ packet 130 transmitted by the third node 115 includes data indicating that the third node is handling 2,000 active session (1,000 of the first type, and 1,000 of the second type). Upon receiving the first NLZ packets 130, the first node 105 determines a first summation of active sessions within the NLZ based on the first NLZ packets 130 received from the second and third nodes 110, 115 and the total number of active sessions handled at the first node 105. In the present example, the first summation indicates that the nodes 105, 110, 115 within the NLZ are handling 9,000 total active session of which 4,500 are of the first type and 4,500 are of the second type. Based on the first summation, the first node 105 can determine if newly received session requests 120 should be accepted or rejected. In the present example, the first node 105 has determined that the license pool 140 includes 1,000 remaining session licenses of which 500 are of the first type and 500 are of the second type. The second node 110 and the third node 115 are configured to processes first NLZ packets 130 in a similar manner.

As described above, session licenses shift between the first through third nodes 105, 110, 115 as traffic loading patterns change on each of the nodes. Referring to FIG. 2B, the first node 105 is shown receiving second NLZ packets 130 from the second node 110 and the third node 115. The second NLZ packet 130 transmitted by the second node includes data indicating that the second node is handling 6,000 active sessions (3,000 of the first type, and 3,000 of the second type), and the second NLZ packet 130 transmitted by the third node 115 includes data indicating that the third node is handling 1,000 active session (500 of the first type, and 500 of the second type). Upon receiving the second NLZ packets 130, the first node 105 determines a second summation of active sessions within the NLZ based on the second NLZ packets 130 received from the second and third nodes 110, 115 and the total number of active sessions handled at the first node 105. In the present example, the second summation indicates that the nodes 105, 110, 115 within the NLZ are handling 8,000 total active sessions of which 4,000 are of the first type and 4,000 are of the second type. Based on the second summation, the first node 105 can determine if newly received session requests 120 should be accepted or rejected. In the present example, the first node 105 has determined that the license pool 140 now includes 2,000 remaining session licenses of which 1,000 are of the first type and 1,000 are of the second type. The second node 110 and the third node 115 are configured to processes second NLZ packets 130 in a similar manner.

The first service type can include one selected from the group consisting of: VoIP session access licenses, peering session access licenses, subscriber session access licenses, data channel connection licenses, SMS text message access licenses, Diameter message access licenses, voice transcoding session access licenses by codec type, presence session access licenses, video session access licenses, video transcoding session access licenses by codec type, expansion session access licenses, burst session access licenses, streaming media session access licenses, instant messenger session access licenses and XMPP session access licenses.

The second service type can include one selected from the group consisting of: VoIP session access licenses, peering session access licenses, subscriber session access licenses, data channel connection licenses, SMS text message access licenses, Diameter message access licenses, voice transcoding session access licenses by codec type, presence session access licenses, video session access licenses, video transcoding session access licenses by codec type, expansion session access licenses, burst session access licenses, streaming media session access licenses, instant messenger session access licenses and XMPP session access licenses. In some embodiments, the first service type and second service type are different.

Figure 3:
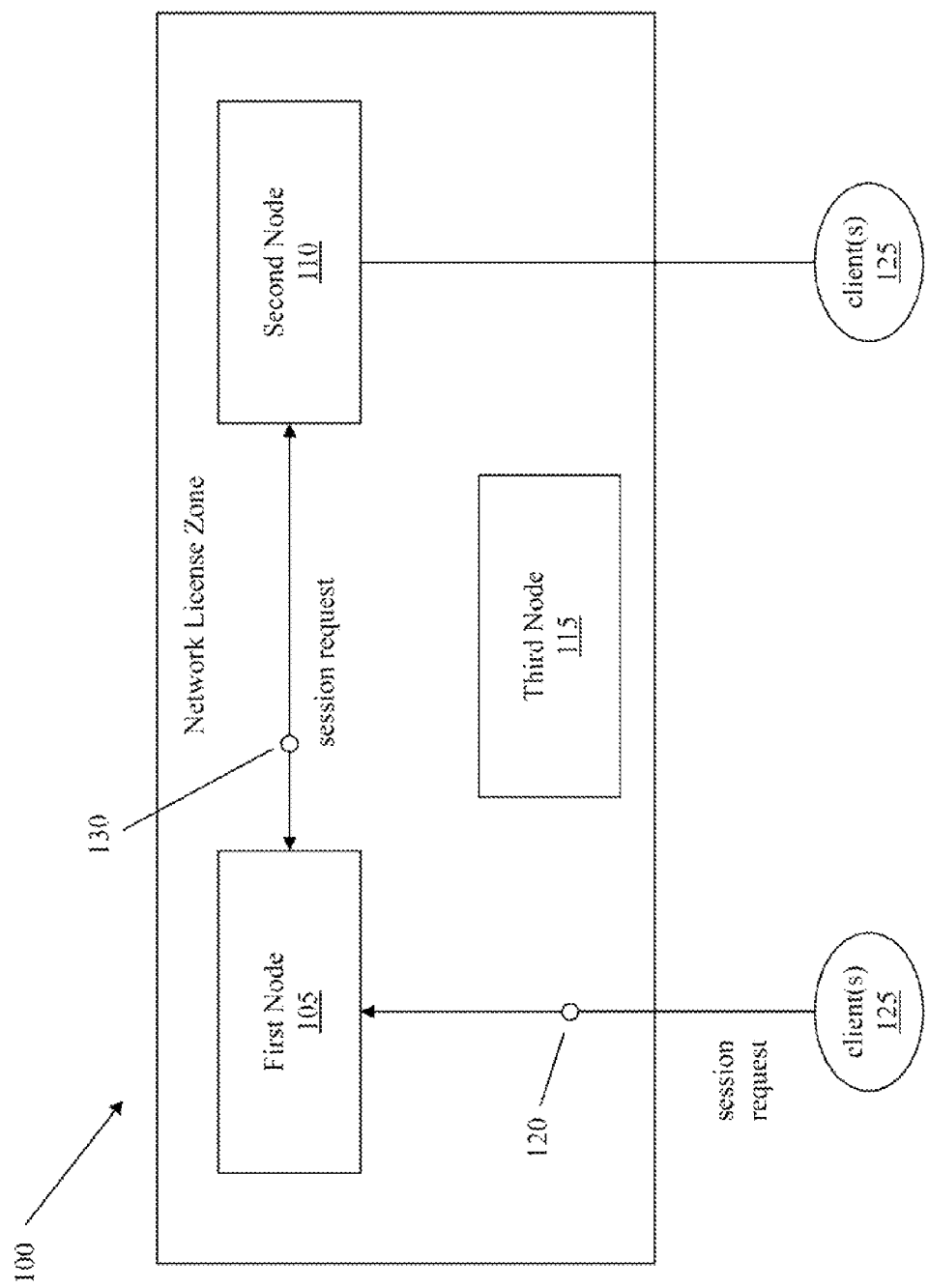
FIG. 3 is a diagram that illustrates a tandem session in a network license zone architecture, in accordance with embodiments of the present application.

FIG. 3 is a diagram that illustrates a tandem session in a network license zone architecture 100. The nodes 105, 110, 115 within the NLZ can be configured to handle tandem switched sessions without consuming two session licenses. That is, a tandem session that directly traverses two nodes within the NLZ will consume a single network session license. For example, a first client device 125 transmits a session request 120 to the first node 105 requesting a connection, such as a VoIP connection, with a first device of the second node 110. Upon granting the session request, the first node 105 will indicate that the connection with the second node 110 is active at the first node 105 (i.e., the first node 105 will count the session as active when determining a summation of active sessions within the NLZ). However, the second node 110 will not count the VoIP session initiated by the first client device 125 at the first node 105. For example, the NLZ packet 130 transmitted by the second node 110 to the first node 105 will indicate that the session initiated by the first client device 125 of the first node 105 is a tandem session. In this manner, the nodes 105, 110, 115 within the NLZ will accurately determine the number of active sessions traversing the network, and not just the additive number of sessions on each node within the network.

Figure 4:
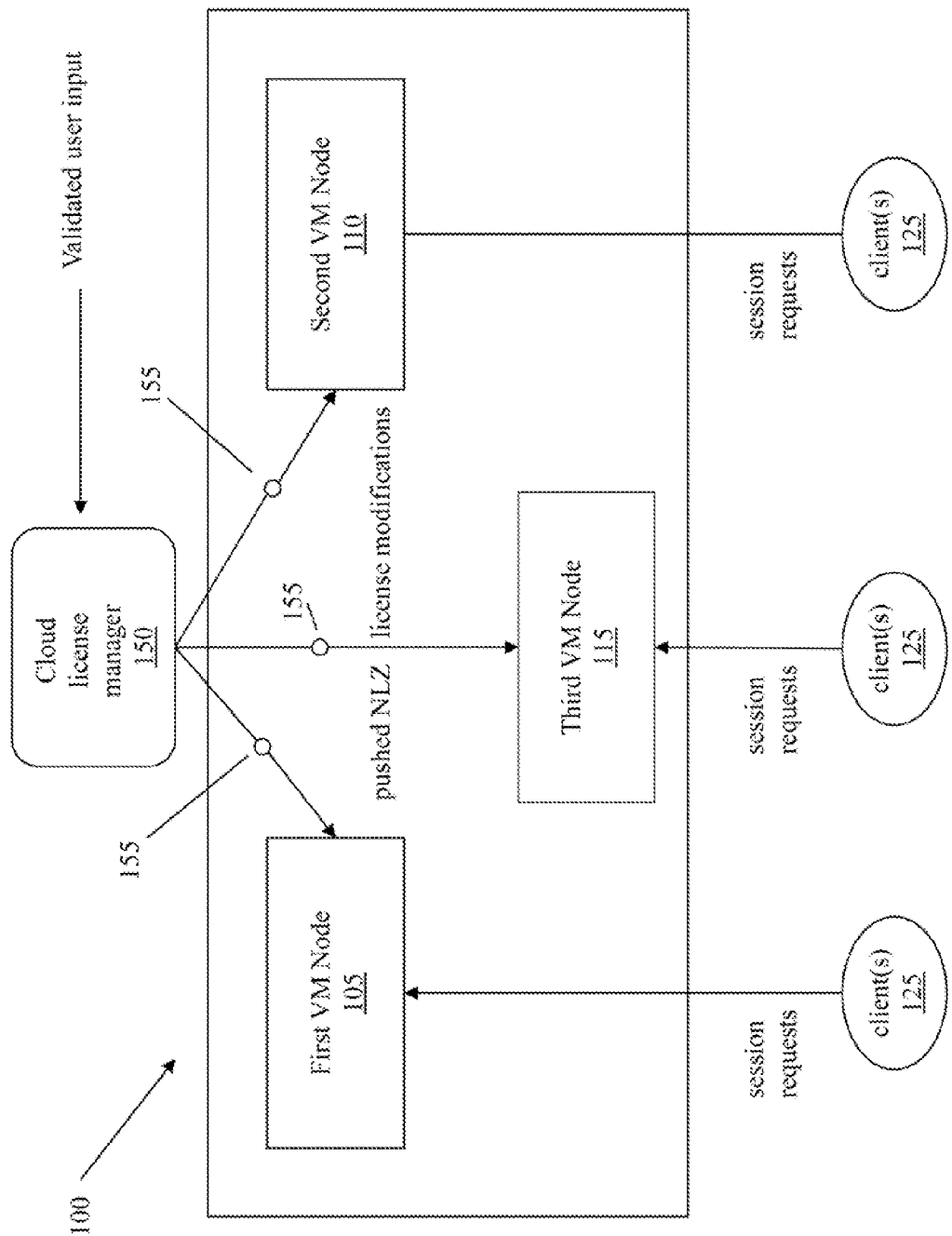
FIG. 4 is a diagram that illustrates a method of license control within a network license zone architecture, in accordance with embodiments of the present application.

FIG. 4 is a diagram that illustrates a method of license control within a network license zone architecture 100. In this exemplary embodiment, the first through third nodes 105, 110, 115 are implemented as cloud based Virtual Machines (VMs) or as instances to allow operators to active/deactivate the nodes without interruption to other nodes.

A cloud license manager 150 is provided and configured to push license modifications to the VM's or instances 105, 110, 115 within the NLZ. For example, this can occur via secure access to a control interface, such as a web interface, of the cloud license manager 150. Additionally via secure access to the cloud license manager 150, the list of IP addresses of the VM's or instances 105, 110, 115 within the NLZ can be modified. In this manner, the movement of network session licenses within the NLZ can be easily and quickly controlled. For example, the IP address of a node within the NLZ can be eliminated thereby deactivating the node.

In a cloud network, such as the network shown in FIG. 3, the VM's or instances 105, 110, 115 can be virtual and subject to change dynamically as described above. The cloud license manager 150 can be configured to add and/or delete nodes as needed, and generate a new set of licenses to be pushed to the VM's or instances within the NLZ.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VoIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

While the present inventive concepts have been particularly shown and described above with reference to exemplary embodiments thereof, it will be understood by those of ordinary skill in the art, that various changes in form and detail can be made without departing from the spirit and scope of the present inventive concepts described and defined by the following claims.

What is claimed is:

1. A method for controlling session access within a cloud-based network license zone (NLZ), wherein the NLZ is a plurality of virtual machines that are operated by a single entity and are configured to permit session access according to a zone-wide session license, the method comprising:
   registering, by a cloud license manager within the NLZ, one or more virtual machines;
   modifying, by the cloud license manager, the zone-wide session license based upon the registration step and transmitting the modified zone-wide session license to the plurality of virtual machines within the NLZ;
   receiving periodically, by each of the plurality of virtual machines within the NLZ, a network access message from each of the other virtual machines within the NLZ, each network access message including a count of active sessions enumerated by service type currently processed by the other virtual machine;
   determining, by each of the plurality of virtual machines within the NLZ, a summation of active sessions within the NLZ, the summation based in part on the network access messages and a count of active sessions currently processed by the virtual machine; and
   enforcing, by each of the plurality of virtual machines within the NLZ, a total count of active sessions within the NLZ, each virtual machine configured to reject new session requests received at the virtual machine when the total count of active sessions within the NLZ exceeds a predetermined number of active sessions as defined in the modified zone-wide session license.

2. The method of claim 1, further comprising:
   determining, by each of the plurality of virtual machines within the NLZ, a summation of active sessions for a first service type, the summation based in part on the network access messages and a count of active sessions of the first service type currently processed by the virtual machine; and
   enforcing, by each of the plurality of virtual machines within the NLZ, a count of active sessions for the first service type within the NLZ, each virtual machine configured to reject new session requests for the first service type received at the virtual machine when the total count of active sessions of the first service type within the NLZ exceeds a predetermined number of active sessions of the first service type as defined in the modified zone-wide session license.

3. The method of claim 2, wherein each of the plurality of virtual machines within the NLZ is further configured to accept new session requests of the first service type received at the virtual machine when the count of active sessions for the first service type within the NLZ is below the predetermined number of active sessions of the first service type.

4. The method of claim 1, wherein each of the plurality of virtual machines within the NLZ is further configured to accept new session requests associated with an emergency telephone call when the total count of active sessions within the NLZ exceeds the predetermined number of active sessions.

5. The method of claim 4, wherein each of the plurality of virtual machines within the NLZ includes a configurable list of emergency telephone calling numbers.

6. The method of claim 1, wherein an active session originating at a first client device of a first one of the plurality of virtual machines within the NLZ and terminating at a second client device of a second one of the plurality of virtual machines within the NLZ is counted in the summation of active sessions determined by the first one of the plurality of virtual machines but is omitted from the summation of active sessions determined by the second one of the plurality of virtual machines.

7. The method of claim 6, wherein an active session originating at a third client device of the second one of the plurality of virtual machines within the NLZ and terminating at a fourth client device of the first one of the plurality of virtual machines within the NLZ is counted in the summation of active sessions determined by the second one of the plurality of virtual machines but is omitted from the summation of active sessions determined by the first one of the plurality of virtual machines.

8. The method of claim 6, wherein the second one of the plurality of virtual machines within the NLZ is further configured to accept new session requests received at the second one of the plurality of virtual machines within the NLZ when the total count of active sessions within the NLZ is below the predetermined number of active sessions.

9. The method of claim 1, wherein the registering step further comprises authenticating the one or more virtual machines based upon credential information transmitted to the cloud license manager.

10. The method of claim 9, wherein the cloud license manager assigns the one or more virtual machines to an NLZ based upon the authentication step.

11. The method of claim 1, wherein the cloud license manager modifies the zone-wide session license to include an identifier associated with each of the registered virtual machines.

12. The method of claim 1, wherein the NLZ includes the registered virtual machines after the registration step.

13. The method of claim 1, wherein each of the plurality of virtual machines within the NLZ includes a node list including identifiers for all of the virtual machines within the NLZ.

14. The method of claim 13, wherein the identifiers of the node list include IP addresses.

15. The method of claim 14, further comprising modifying, by each of the plurality of virtual machines, the node list based upon the modified zone-wide session license received from the cloud license manager.

16. The method of claim 15, wherein the modified node list includes a number of licensed sessions by service type.

17. The method of claim 1, wherein each virtual machine is hosted on a separate hardware system.

18. The method of claim 1, wherein the new session requests correspond to at least one selected from the group consisting of: a VoIP session request, a message for destination user, a request for a video stream, a chat session, a collaboration request, a data transfer channel, a text message and instant message.

19. The method of claim 1, wherein the zone-wide session license includes one or more categories of session access licenses.

20. The method of claim 19, wherein the one or more categories of session access licenses is selected from the group consisting of: VoIP session access licenses, peering session access licenses, subscriber session access licenses, data channel connection licenses, Diameter message access licenses, transcoding session access licenses, presence session access licenses, video session access licenses, expansion session access licenses, burst session access licenses, media session access licenses, instant messenger session access licenses and XMPP session access licenses.

21. The method of claim 1, wherein an active session originating at a first client device connected to a second one of the plurality of virtual machines within the NLZ and terminating at a first client device connected to a first one of the plurality of virtual machines within the NLZ is omitted from the summation of active sessions.

22. A system for controlling session access within a cloud-based network license zone (NLZ), wherein the NLZ is a plurality of virtual machines that are operated by a single entity and are configured to permit session access according to a zone-wide session license, the system comprising: a cloud license manager within the NLZ that is configured to: register one or more virtual machines, each of the virtual machines located on a server computing device; and modify the zone-wide session license based upon the registration step and transmitting the modified zone-wide session license to the plurality of virtual machines within the NLZ; and the plurality of virtual machines within the NLZ, wherein each of the plurality of virtual machines is configured to: receive periodically a network access message from each of the other virtual machines within the NLZ, each network access message including a count of active sessions enumerated by service type currently processed by the other virtual machine; determine a summation of active sessions within the NLZ, the summation based in part on the network access messages and a count of active sessions currently processed by the virtual machine; and enforce a total count of active sessions within the NLZ, each virtual machine configured to reject new session requests received at the virtual machine when the total count of active sessions within the NLZ exceeds a predetermined number of active sessions as defined in the modified zone-wide session license.

23. The system of claim 22, wherein the registering step further comprises authenticating the one or more virtual machines based upon credential information transmitted to the cloud license manager.

24. The system of claim 23, wherein the cloud license manager assigns the one or more virtual machines to an NLZ based upon the authentication step.

25. The system of claim 22, wherein the cloud license manager modifies the zone-wide session license to include an identifier associated with each of the registered virtual machines.

26. The system of claim 25, wherein the identifiers of the node list include IP addresses.

27. The system of claim 22, wherein the NLZ includes the registered virtual machines after the registration step.

28. The system of claim 22, wherein each of the plurality of virtual machines within the NLZ includes a node list including identifiers for all of the virtual machines within the NLZ.

29. The system of claim 28, further comprising modifying, by each of the plurality of virtual machines, the node list based upon the modified zone-wide session license received from the cloud license manager.

30. A computer program product, tangibly embodied in a computer readable storage device, for controlling session access within a network license zone (NLZ), wherein the NLZ is a plurality of virtual machines that are operated by a single entity and are configured to permit session access according to a zone-wide session license, the computer program product comprising instructions being executable to:
cause a cloud license manager within the NLZ to:
  register one or more virtual machines; and
  modify the zone-wide session license based upon the registration step and transmitting the modified zone-wide session license to the plurality of virtual machines within the NLZ; and
cause each of the other virtual machines within the NLZ to:
  periodically receive a network access message from each of the other virtual machines within the NLZ, each network access message including a count of active sessions enumerated by service type currently processed by the other virtual machine;
  determine a summation of active sessions within the NLZ, the summation based in part on the network access messages and a count of active sessions currently processed by the virtual machine; and
  enforce a total count of active sessions within the NLZ, the virtual machine configured to reject new session requests received at the virtual machine when the total count of active sessions within the NLZ exceeds a predetermined number of active sessions as defined in the modified zone-wide session license.

* * * * *

UNITED STATES PATENT AND TRADEMARK OFFICE
CERTIFICATE OF CORRECTION

| | |
|---|---|
| PATENT NO. | : 8,738,774 B2 |
| APPLICATION NO. | : 14/101185 |
| DATED | : May 27, 2014 |
| INVENTOR(S) | : Jonqjenq Max Sheng et al. |

It is certified that error appears in the above-identified patent and that said Letters Patent is hereby corrected as shown below:

On the Title Page, item [54], and in the Specification, Column 1, lines 1 and 2, Title, delete "COULD-BASED DYNAMIC SESSION LICENSE CONTROL" and replace it with --CLOUD-BASED DYNAMIC SESSION LICENSE CONTROL--

Signed and Sealed this
Twenty-sixth Day of August, 2014

Michelle K. Lee
*Deputy Director of the United States Patent and Trademark Office*